United States Patent [19]

Bley

[11] Patent Number: 6,038,012
[45] Date of Patent: *Mar. 14, 2000

[54] PHOTO IDENTIFICATION CARD SYSTEM

[75] Inventor: Frederick O. Bley, Reston, Va.

[73] Assignee: Optical & Electronic Research, Reston, Va.

[*] Notice: This patent issued on a continued prosecution application filed under 37 CFR 1.53(d), and is subject to the twenty year patent term provisions of 35 U.S.C. 154(a)(2).

[21] Appl. No.: 08/971,408

[22] Filed: Nov. 17, 1997

[51] Int. Cl.[7] ............................. G03B 27/52; G06K 9/00
[52] U.S. Cl. ............................................. 355/40; 382/115
[58] Field of Search ............................... 348/156, 96, 77; 382/116, 106, 112, 115, 119; 355/40

[56] References Cited

U.S. PATENT DOCUMENTS

| | | | |
|---|---|---|---|
| 3,667,364 | 6/1972 | Mann | 95/37 |
| 3,928,863 | 12/1975 | Stewart et al. | 354/109 |
| 4,195,923 | 4/1980 | Craven et al. | 354/91 |
| 4,522,146 | 6/1985 | Carlson | 116/2 |
| 4,597,655 | 7/1986 | Mann | 354/121 |
| 4,729,128 | 3/1988 | Grimes et al. | 382/58 |
| 4,999,065 | 3/1991 | Wilfert | 156/64 |
| 5,157,424 | 10/1992 | Craven et al. | 346/160 |
| 5,180,906 | 1/1993 | Yamada | 235/487 |
| 5,261,987 | 11/1993 | Luening et al. | 156/235 |
| 5,410,642 | 4/1995 | Hakamatsuka et al. | 395/113 |
| 5,558,021 | 9/1996 | Erhard et al. | 101/232 |
| 5,587,740 | 12/1996 | Brennan | 348/373 |
| 5,602,933 | 2/1997 | Blackwell et al. | 382/116 |
| 5,617,528 | 4/1997 | Stechmann et al. | 395/326 |
| 5,642,160 | 6/1997 | Bennett | 348/156 |
| 5,668,874 | 9/1997 | Kristol et al. | 380/23 |
| 5,688,738 | 11/1997 | Lu | 503/227 |
| 5,717,776 | 2/1998 | Watanabe | 382/116 |
| 5,768,143 | 6/1998 | Fujimoto | 364/479.05 |

*Primary Examiner*—Alan A. Mathews
*Assistant Examiner*—Hung Henry Nguyen
*Attorney, Agent, or Firm*—Morgan & Finnegan, L.L.P.

[57] ABSTRACT

A photo identification card system includes a housing having a chassis, a camera, a data input device, a processor, a printing device and a display. The camera records a video image and is integrally attached to the housing. The data input device receives information related to the image. The processor, which is contained in the housing, arranges the recorded image and the information into a selected format for an identification card. The printing device prints the recorded image and the information in the selected format for the identification card. The printing device is a self-contained unit that is integrally attached to the chassis and is not modified to be attached to the chassis. The display displays the recorded image, and is attached to the housing having a closed position that is flush with an outer surface of the housing, and having an opened position for when system the display is in use. The photo identification system also includes a memory that is contained in the housing and is removable from the housing. The memory stores recorded images and the information associated with the recorded images in the selected format.

12 Claims, 9 Drawing Sheets

PHOTO IDENTIFICATION CARD SYSTEM

BACKGROUND OF THE INVENTION

1. Field of the Invention

The present invention relates to the field of photo identification. More particularly, the present invention relates to a system for producing photo identification cards.

2. Description of the Related Art

Photo identification cards are well-known and used for such purposes as drivers' licenses, employee identification cards, government and utility employee identification cards, club membership cards and student identification cards. Conventional systems that produce photo identification cards typically include several components that are coupled together by cables, such as cameras and printers, or require that a card be physically transported between two pieces of equipment, such as a printer and a laminating device, so that the card can be completed.

What is needed is a complete photo identification card system that is compact and self-contained, and automatically produces photo identification cards under control of an operator.

SUMMARY OF THE INVENTION

The present invention provides a complete photo identification system that is compact and self-contained. The advantages of the present invention are provided by a photo identification card system includes a housing having a chassis, a camera, a data input device, a processor, a printing device and a display. The camera records a video image and is integrally attached to the housing using a mounting plate. The data input device receives information related to the image. The processor, which is contained in the housing, arranges the recorded image and the information into a selected format for an identification card on a card made from a PVC, a polyester or an ABS material using either a monochrome resin thermal transfer printing process or a dye-sublimation printing process. The printing device prints the recorded image and the information in the selected format for the identification card. The printing device is a self-contained unit that is integrally attached to the chassis and is not modified to be attached to the chassis. The display displays the recorded image, and is attached to the housing having a closed position that is flush with an outer surface of the housing, and having an opened position for when system the display is in use. The photo identification system also includes a memory that is contained in the housing and is removable from the housing. The memory stores recorded images and the information associated with the recorded images in the selected format. A magnetic stripe encoding module can be used for encoding a magnetic stripe on the identification card. A signature digitizing device can be used for recording a signature, and a fingerprint digitizing device can be used for recording a fingerprint. When the photo identification card is a smart card, a smart card chip encoding module can be used for encoding the identification card.

BRIEF DESCRIPTION OF THE DRAWING

The present invention is illustrated by way of example and not limitation in the accompanying figures in which like reference numerals indicate similar elements and in which.

DETAILED DESCRIPTION

The present invention provides a compact, self-contained photo identification card system that produces photo identification cards faster and less expensive than conventional photo identification systems. The present invention includes a color display screen having an integrated video camera, a computer processing system, a keyboard, and a full-color card printer for producing photo identification cards that can be used for, for example, membership cards, identification and access control cards and account charging cards.

Figure 1:
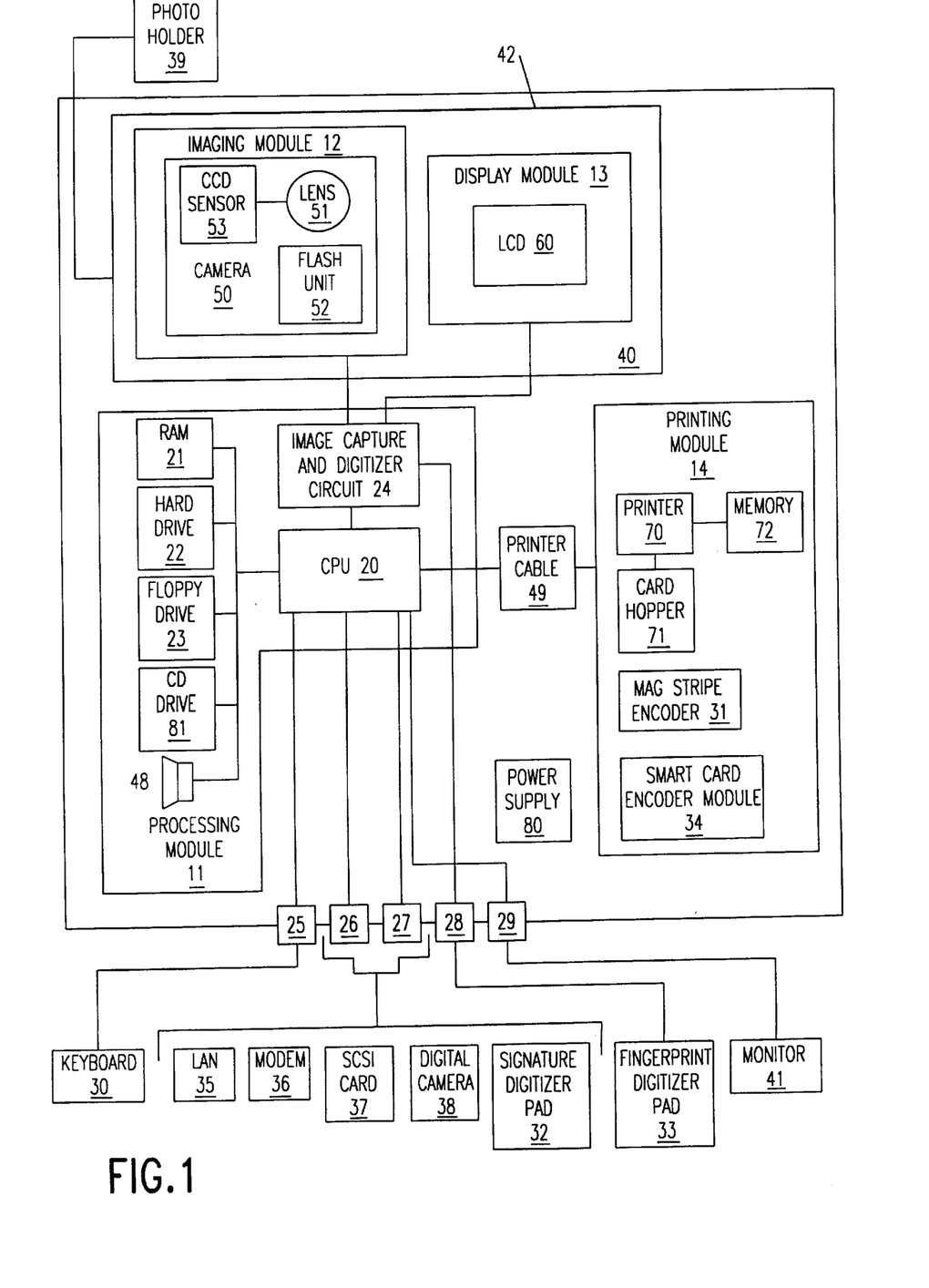
FIG. 1 is a schematic block diagram of a photo identification card system according to the present invention.

FIG. 1 is a schematic block diagram of photo identification card system 10 according to the present invention. System 10 includes a processing module 11, an imaging module 12, a display module 13, a printing module 14 and a housing 40 having a chassis 82. Processing module 11 includes a central processing unit (CPU) 20, such as a Pentium™ class CPU, a random access memory (RAM) 21, a hard disk drive 22, a floppy disk drive 23, a CD drive 81, an image capture and digitizer circuit 24, a keyboard interface port 25, serial interface ports 26 and 27, a secondary video capture input port 28, a VGA output port 29, and a speaker 48. Preferably, RAM 21 includes 16 MByte of memory, hard drive 22 is a removable hard drive having 1.6 Gigabytes of memory in which up to 40,000 card images can be stored, and floppy drive 23 is a 1.44 MB floppy drive. Image capture and digitizer circuit 24 digitizes video images in a well-known manner under control of CPU 20. Speaker 48 provide audible indications in a well-known manner for an operator of system 10. Housing 40 contains processing module 11, while camera module 12 and display module 13 are attached to housing 40. Printing module 14 is a self-contained unit that is integrally attached to chassis 82 using a mounting plate or support 83. According to the invention, printing module 14 has not been modified when it is attached to chassis 82.

The internal database structure used by processing module 11 preferably complies with xBase standards, thus making images and information recorded by system 10 compatible with dBase, FoxPro, Clipper, and many other well-known database engines. Additionally, processing module 11 can include an ODBC (Open DataBase Connectivity) drive for full SQL level Oracle 6 compatibility. Each full-color video image captured and recorded by system 10 is preferably stored as a compressed DIB (Device Independent Bitmap) file of about 8K byte in size, and that can be exported to other systems and decompressed using standard JPEG routines.

Keyboard interface port 25 connects processing module 11 to a low-profile compact keyboard 30. Interface ports 26 and 27 can be used for connecting to other functional blocks such as an external signature digitizer pad 32, a Local Area Network (LAN) 35, a modem 36, a SCSI interface connection 37 and/or an external digital camera 38. Secondary video capture input port 28 accepts an analog video signal from an external fingerprint digitizer pad 33 for digitization and processing by image capture and digitization circuit 24. Signature digitizer pad 32 and fingerprint digitizer pad 33 are used for recording a card holder's signature and fingerprint, respectively, for printing on a card. The fingerprint image reference data is saved and can be transferred to fingerprint security matching systems. VGA output port 29 can be connected to an external multisync VGA computer monitor 41.

Imaging module 12 preferably includes a camera 50, a lens 51 and an electronic flash unit 52. Camera 50 is an integrated miniature high-resolution digital signal processing camera having a ¼" CCD sensor 53 with approximately 440,000 pixels (752×596 effective pixels). Camera 50 provides a high horizontal resolution of 400 TV lines, has an auto-aperture feature and provides auto-backlight compensation. Preferably, lens 51 is an F/2.4 horizontal 45° having an auto-focus with macro position feature, that is, being focusable from 1'8" to infinity, and also having a 4.75" macro distance. A photo holder 39 can be used with imaging module 12 for re-imaging existing photographs.

Display module 13 preferably includes a full-color backlit liquid crystal display (LCD) device 60. Imaging module 12 and display module 13 are preferably formed into an integral housing 42 that is hingeably mounted to housing 40 so that housing 42 has a closed, or folded-down, position 43 (FIG. 2B) that is flush with an outer surface of housing 40, and has an opened, or folded-up, position 44 (FIG. 2A) when system 10 is in use.

Figure 3A:
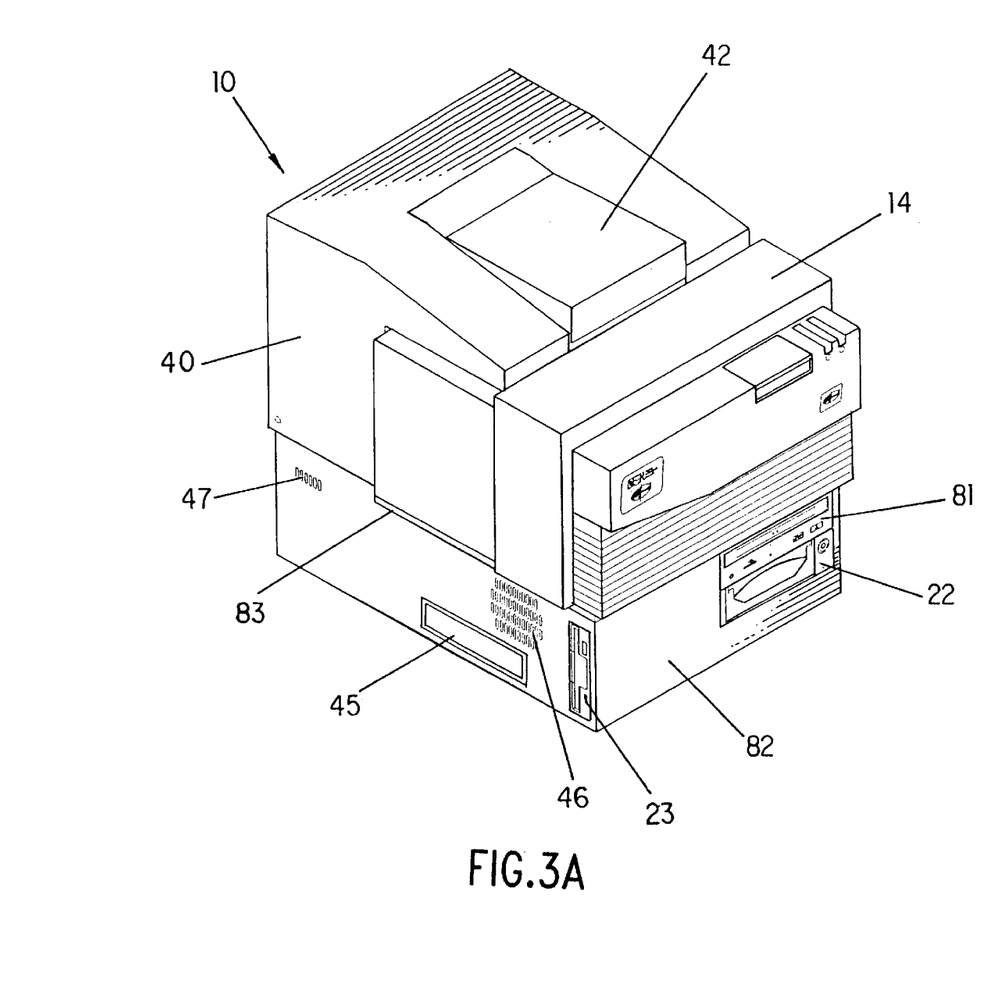
FIGS. 3A and 3B respectively show first and second embodiments of a photo identification card system according to the present invention in which different printing modules are used.
Figure 3B:
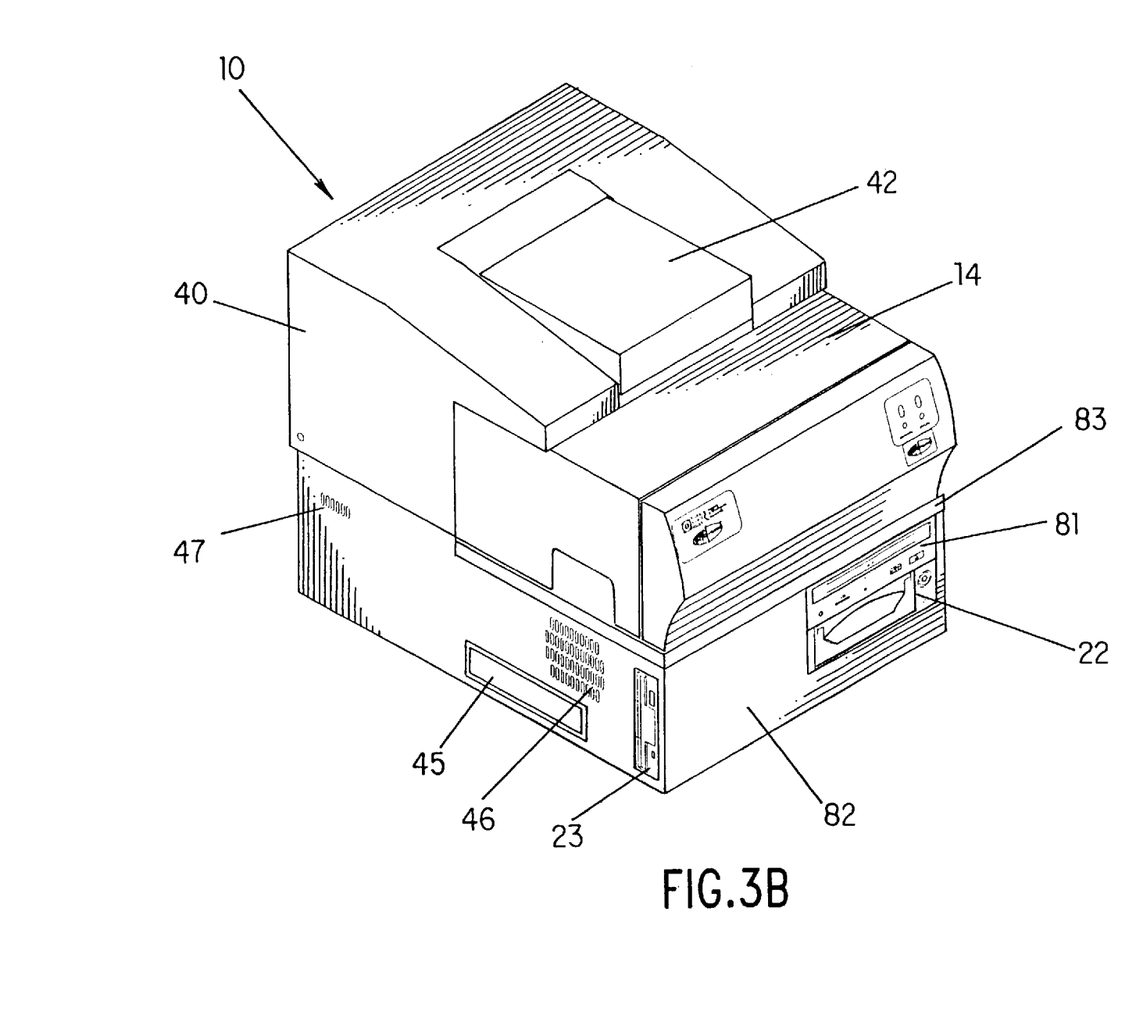
Figure 4A:
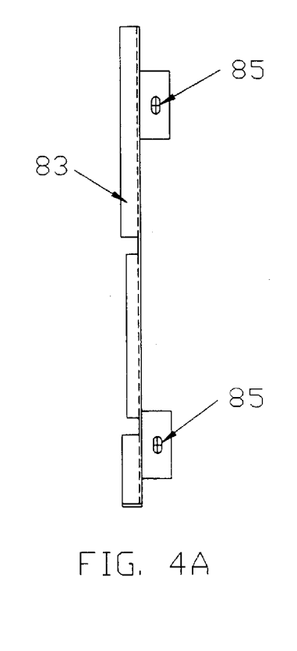
FIGS. 4A, 4B and 4C show different views of a first embodiment of a mounting plate used for attaching a printing module to a chassis of the photo identification card system of the present invention.
Figure 4B:
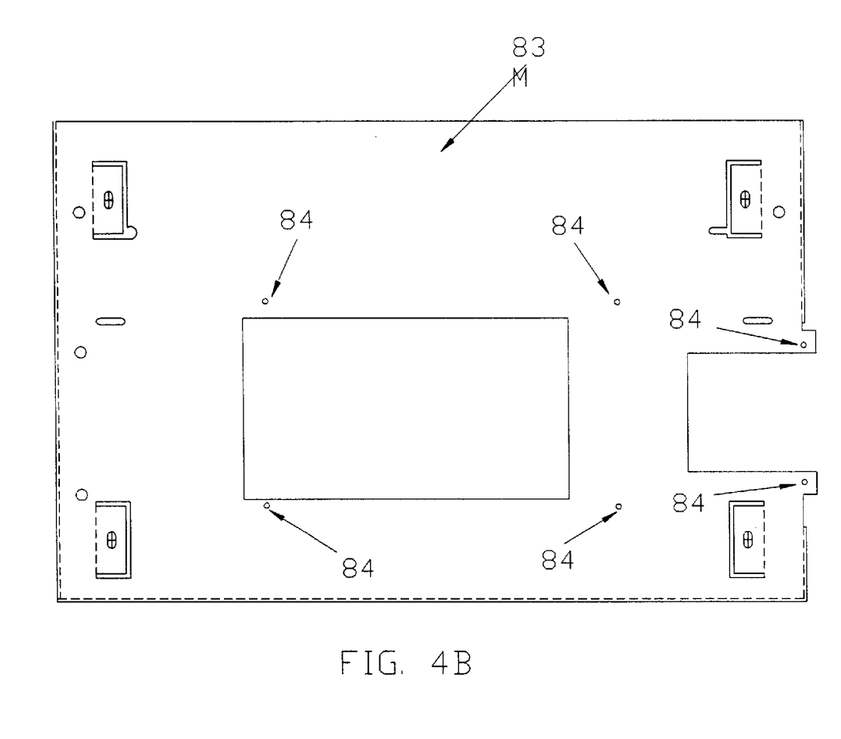
Figure 4C:
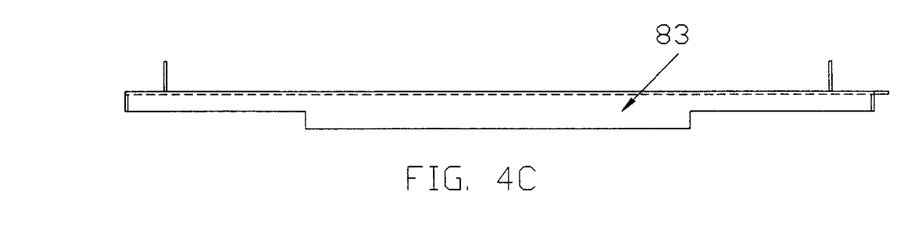
Figure 5A:
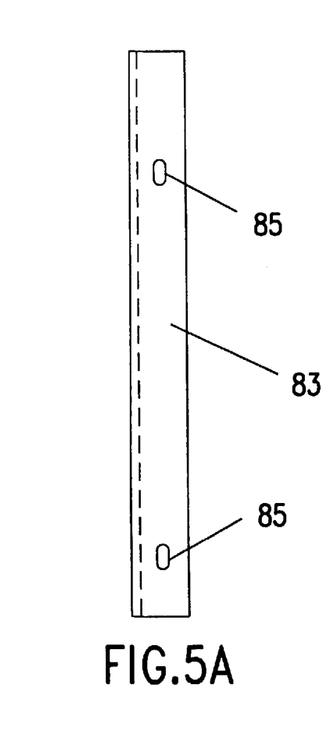
FIGS. 5A, 5B and 5C shows different views of a second embodiment of a mounting plate used for attaching a printing module to a chassis of the photo identification card system of the present invention.
Figure 5B:
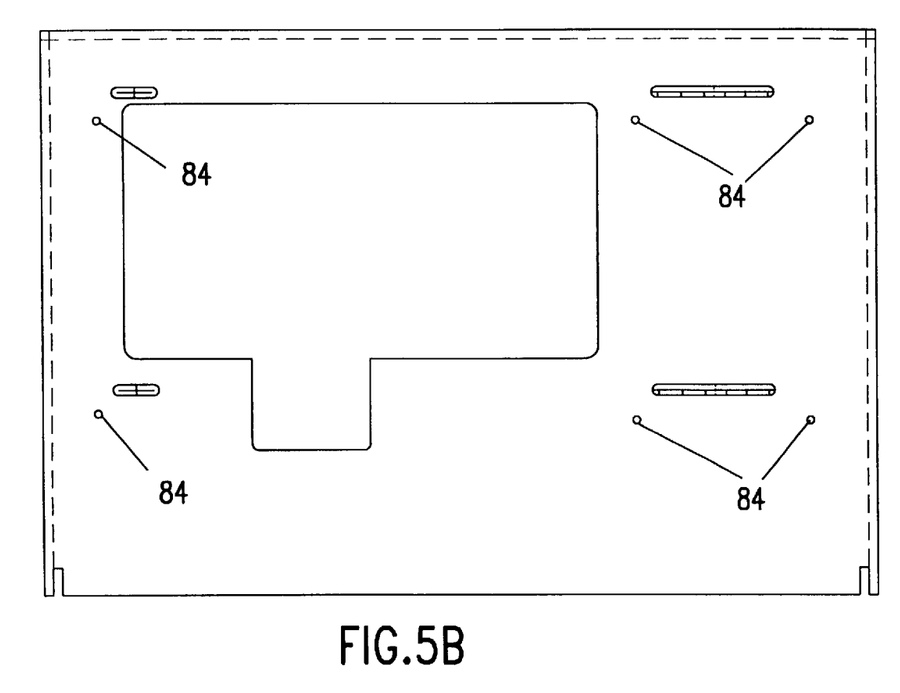
Figure 5C:
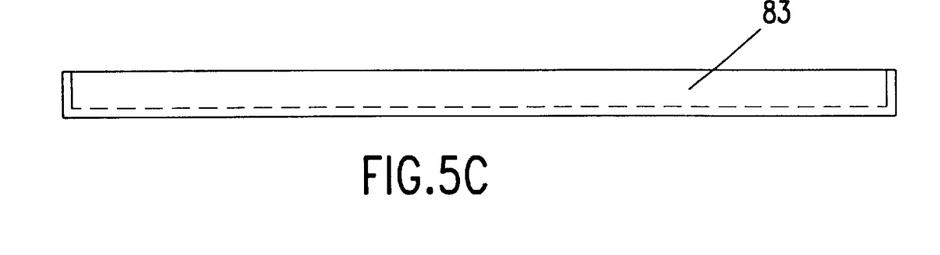

Printing module 14 includes an integrated dye-sublimation 300 DPI plastic card printer 70 that can perform full edge-to-edge single-sided and dual-sided card printing on PVC, Polyester, or ABS cards, including printing bar codes for any alpha/numeric data. Printing module 14 can also include a magnetic stripe encoding module 31 that preferably provides both high or low coercivity for up to three tracks of recorded data and a smart card chip encoding module 34. Preferably, printing module 14 is a standardly available integrated dye-sublimation plastic card printer, such as a Fargo Cheetah printer (FIG. 3A) and a Fargo Presto printer (FIG. 3B). According to the invention, printing module 14 is not modified when mounted to mounting support 83 so that the manufacturer's warrant is not voided. Mounting plate 83, adapted for each respective preferred printer, is attached to printing module 14 using standard machine screws through existing holes 84. FIGS. 4 and 5 show first and second embodiments, respectively, of mounting plate 83 for the attaching the Fargo Cheetah printer and the Fargo Presto printer, respectively, to chassis 82. Mounting plate 82 and printing module 14 are attached to chassis 82, also using standard machine screws through holes 85.

Printing module 14 interfaces with processing module 11 through a standard printer cable 49 using a standard pin configuration, such as an RS-232, DB-25, parallel, serial, Centronix or DB-9 configuration depending upon the particular connector supplied with printing module 14. Power supply module 80 is the power supply module supplied by the manufacturer of printing module 14. Servicing and replacing printing module 14 is easily performed because printing module 14 has not been modified.

Figure 2A:
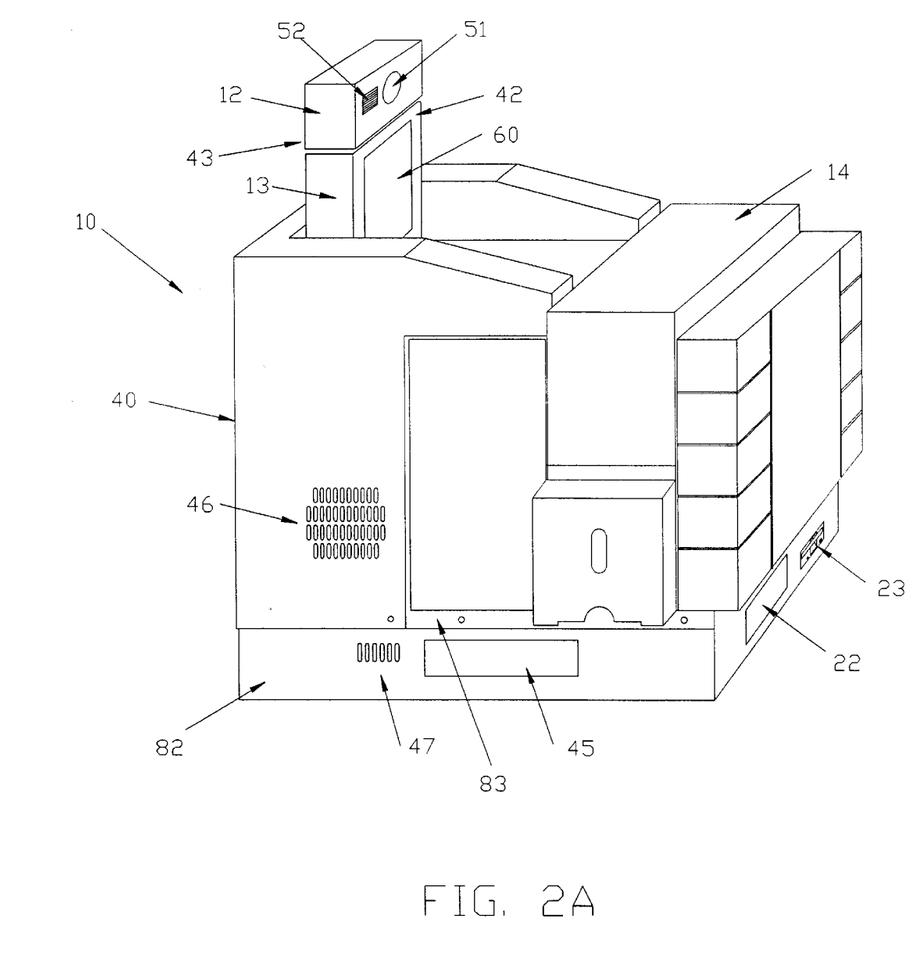
FIG. 2A is an isometric side view of a photo identification card system according to the present invention.
Figure 2B:
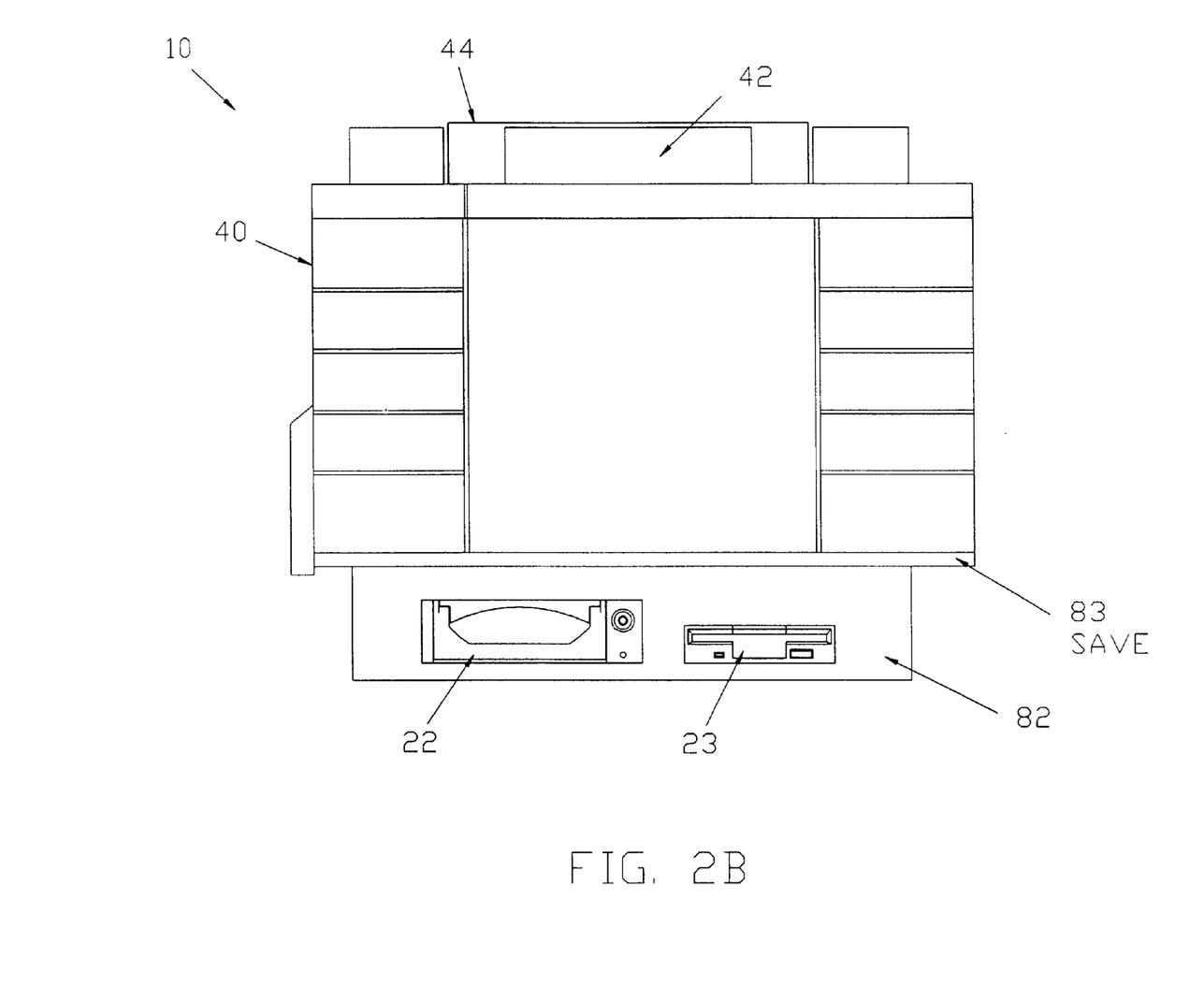
FIG. 2B is a front view of a photo identification card system according to the present invention.
Figure 2C:
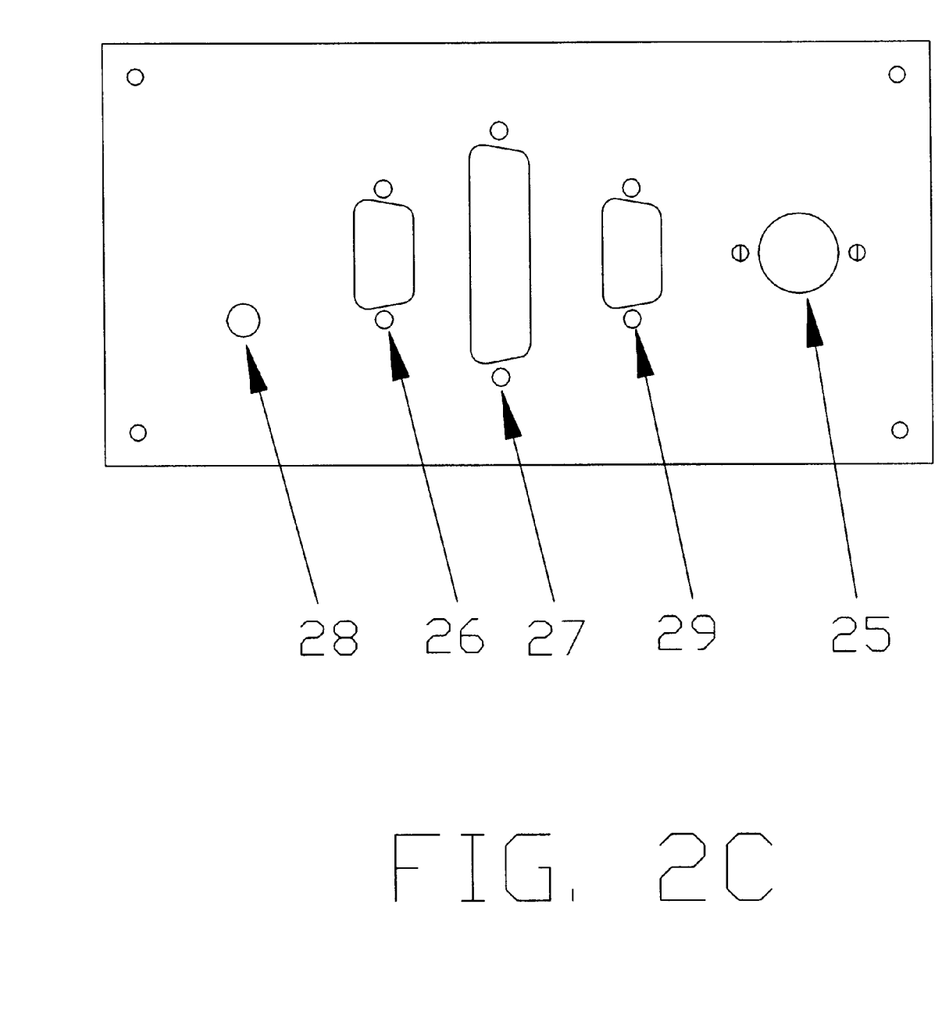
FIG. 2C shows a preferred arrangement of input/output interface connectors for a photo identification card system according to the present invention.

FIG. 2A is an isometric side view of a preferred configuration of photo identification card system 10. FIG. 2B is a front view of photo identification card system 10, and FIG. 2C shows a preferred arrangement of input/output interface connectors on a back panel (not shown) of photo identification card system 10. Housing 40 includes two handles 45, of which only one is shown, hole pattern 46 for an intake for a cooling fan (not shown) and hole pattern 47 for speaker 48. Printing module 14 fits into housing 40 making system 10 compact and self-contained. Preferably the dimensions for system 10 are no greater than about 15" high, 17.5" wide and 17" deep.

Prior to using system 10 for producing a photo ID card, selected information fields, such as name, address, title, clearance, and/or any other related information, and logos are incorporated into a design for the photo ID card using special software, such as Gen-Frame™, run on a separate computer, such as a PC. The special photo ID card design software allows screen prompts and data fields to be defined, bar code or magnetic stripe fields to be designated, database access restrictions to be specified, and glossary re-print functions set up for operators of system 10.

Figure 6:
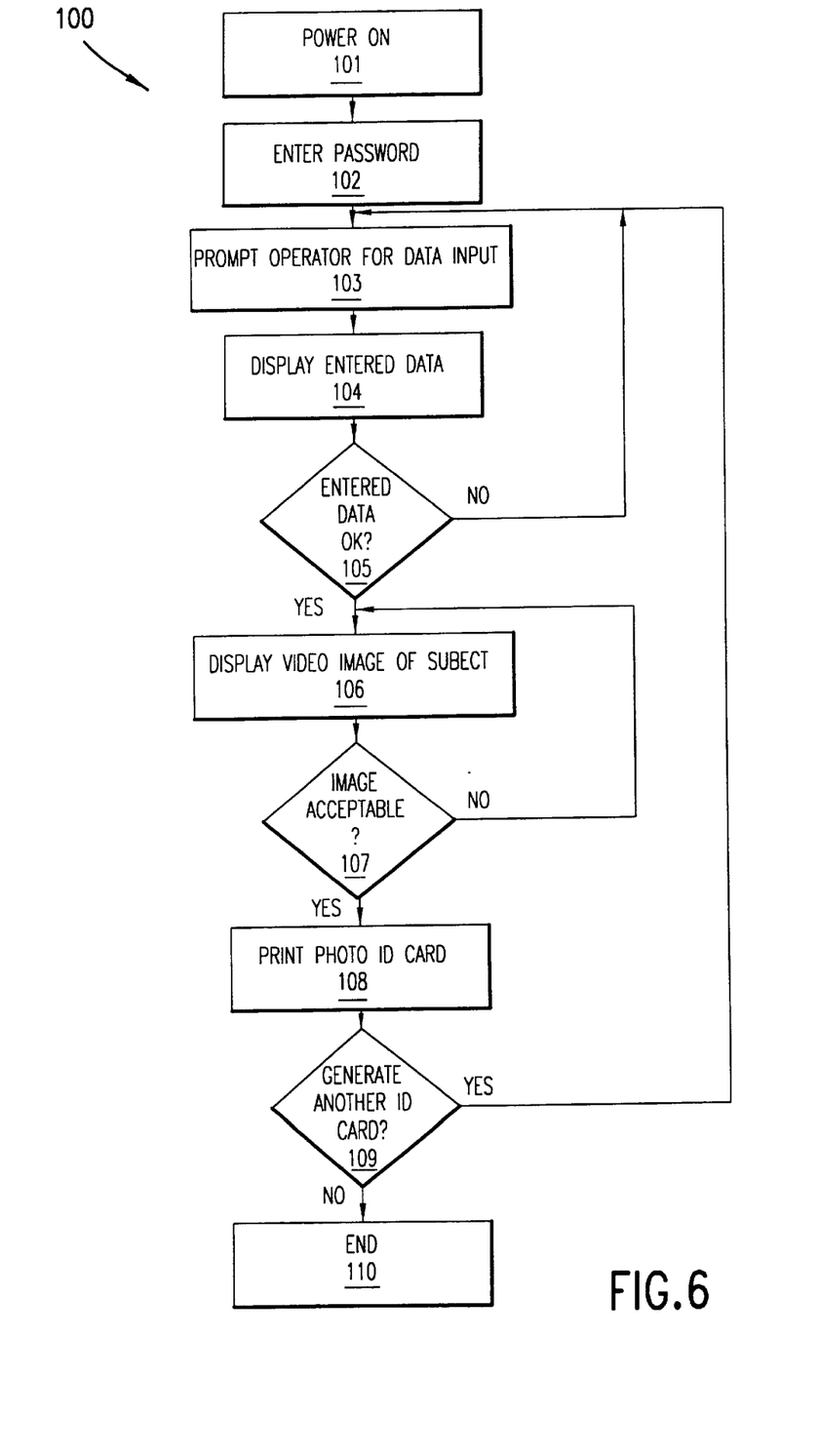
FIG. 6 is a flow chart for a process for generating a photo identification card according to the present invention.

FIG. 6 is a flow chart for a process 100 for generating a photo ID using system 10. Power is applied, or turned on, at step 101. Prompts for an operator's or a supervisor's password are generated at step 102 for system protection. At step 103, the system 10 prompts an operator for selected data about an individual for which a photo ID is being made. The operator responds by entering the requested data via keyboard 30. Alternatively, the requested information can be retrieved from information stored, for example, on hard drive 22, floppy disk drive 23, or on LAN 35. Information about the individual can also be entered via signature digitizer pad 32 and/or a fingerprint digitizer pad 33. Once all of the required information has been entered at step 103, the data is displayed on display module 13 or on monitor 41 at step 104, allowing the user to review and edit the data prior to acceptance. Alternatively, the data can be displayed at it is entered in step 103.

At step 105, the individual verifies that the data entered is correct. If there is an error in the data, flow returns to step 103 for correction. If the data is correct, flow continues to step 106 where a live video image of the individual recorded by imaging module 12 is displayed on display module 13. The individual's image is superimposed with a prompt to "freeze" the image by pressing, for example, the Enter key on keyboard 30. When the image of the individual is acceptable, the Enter key is pressed and the image is captured, or frozen. If the captured image is not acceptable at step 107, the process of freezing the individual's image can be repeated by flow returning to step 106.

When the image of the individual is acceptable, flow continues to step 108 where system 10 automatically prints an identification card by formatting text, graphics, logos, bar codes, headings and boxes into the pre-defined card design. If the card includes a magnetic stripe, system 10 encodes the magnetic stripe using magnetic stripe encoder module 31. Smart card encoding can be performed by smart card encoding module 34. Printing of the card is quickly completed, typically in less than one minute. While the card is being printed, it is determined whether another card is to be generated at step 109. If so, flow returns to step 103 for entry of data for another individual. Otherwise, flow continues to step 110 where the process ends.

While the present invention has been described in connection with the illustrated embodiments, it will be appreciated and understood that modifications may be made without departing from the true spirit and scope of the invention.

What is claimed is:

1. A photo identification card system, comprising:

a housing having a chassis;

a video camera having a charge coupled device (CCD) recording a continuous live video image of an individual, the camera being integrally attached to the housing;

a data input device receiving information related to the image;

a display displaying the continuous live video image recorded by the video camera, the display being integrally attached to the housing;

a processor prompting an operator to enter information related to the individual, receiving the information related to the individual from the data input device, transmitting the data to the display to allow the operator to review or edit the information, receiving a command from the operator to capture the image, arranging the captured image and the information into a selected format for an identification card, the processor being contained in the housing; and a plastic card printing device printing the captured image and the information in the selected format for the identification card, the printing device being a self-contained unit that is integrally attached to the chassis by a mounting plate, thereby making the printer easily removable for repair or replacement, a memory storing software code representing screen prompts and a selected format for the identification card for access by the processor, the selected format including designations of at least one of the following data fields: a signature field, a fingerprint field, a magnetic stripe field, and a barcode field.

2. The system according to claim 1, wherein the display is a liquid crystal device (LCD).

3. The system according to claim 2, wherein the display has a closed position that is flush with an outer surface of the housing, and has an opened position for when system the display is in use.

4. The system according to claim 2, wherein the printing device prints on one of PVC material, polyester material and ABS cards.

5. The system according to claim 4, wherein the printing device uses a monochrome resin thermal transfer printing process.

6. The system according to claim 4, wherein the printing device uses a dye-sublimation printing process.

7. The system according to claim 2, wherein the camera is an integrated miniature high-resolution digital signal processing camera.

8. The system according to claim 1, wherein the memory is removable from the housing.

9. The system according to claim 1, further comprising a magnetic stripe encoding module encoding a magnetic stripe on the identification card.

10. The system according to claim 1, further comprising a signature digitizing device recording a signature.

11. The system according to claim 1, further comprising a fingerprint digitizing device recording a fingerprint.

12. The system according to claim 1, wherein the identification card is a smart card, the system further comprising a smart card chip encoding module encoding the identification card.

* * * * *